United States Patent [19]

Kowalski

[11] 4,263,952
[45] Apr. 28, 1981

[54] FASTENER FOR METAL FRAMING
[75] Inventor: Joseph W. Kowalski, Florissant, Mo.
[73] Assignee: B-Line Systems, Inc., Highland, Ill.
[21] Appl. No.: 53,076
[22] Filed: Jun. 28, 1979
[51] Int. Cl.³ .................. F16B 39/00; E04B 1/00
[52] U.S. Cl. .................. 411/112; 52/710; 411/116
[58] Field of Search ............ 151/41.75, 41.76, 41.7; 85/32 K, 5 P; 403/230, 231; 52/710

[56] References Cited

U.S. PATENT DOCUMENTS

| | | | |
|---|---|---|---|
| 1,306,100 | 6/1919 | Chadwick | 151/68 |
| 2,853,113 | 9/1958 | Flora et al. | 151/41.75 |
| 2,866,372 | 12/1958 | Fisher | 151/69 X |
| 2,908,311 | 10/1959 | Garman | 151/41.75 |
| 3,483,910 | 12/1969 | LaLonde et al. | 151/41.75 |
| 3,493,025 | 2/1970 | LaLonde et al. | 151/41.75 |
| 3,494,646 | 2/1970 | Cumber | 151/41.75 X |
| 4,146,074 | 3/1979 | Kowalski | 151/41.75 |

FOREIGN PATENT DOCUMENTS

| | | | |
|---|---|---|---|
| 513368 | 10/1939 | United Kingdom | 151/41.75 |
| 1061149 | 3/1967 | United Kingdom | 151/41.75 |

Primary Examiner—Ramon S. Britts
Attorney, Agent, or Firm—Senniger, Powers, Leavitt and Roedel

[57] ABSTRACT

A fastener for securing parts to metal framing such as channel framing having side flanges with inwardly, hook-shaped lips defining a slot therebetween. The fastener comprises an elongate body or nut having inside and outside faces, opposite sides and opposite ends, a width less than that of the slot and a length greater than that of the slot. The fastener also includes a clamp member secured to the nut for clamping the nut on the channel. The clamp member has a crosshead which is spaced outwardly from the outside face of the nut and which is longer than the width of the slot. The clamp member also includes a spring latch which is sprung into engagement with the inside face of the channel framing when the nut is in a position wherein its outside face engages the inside face of the framing on opposite sides of the slot, thereby to bring the ends of the crosshead into clamping engagement with the outside face of the framing on opposite sides of the slot and the nut into clamping engagement with the inside face of the framing on opposite sides of the slot.

17 Claims, 7 Drawing Figures

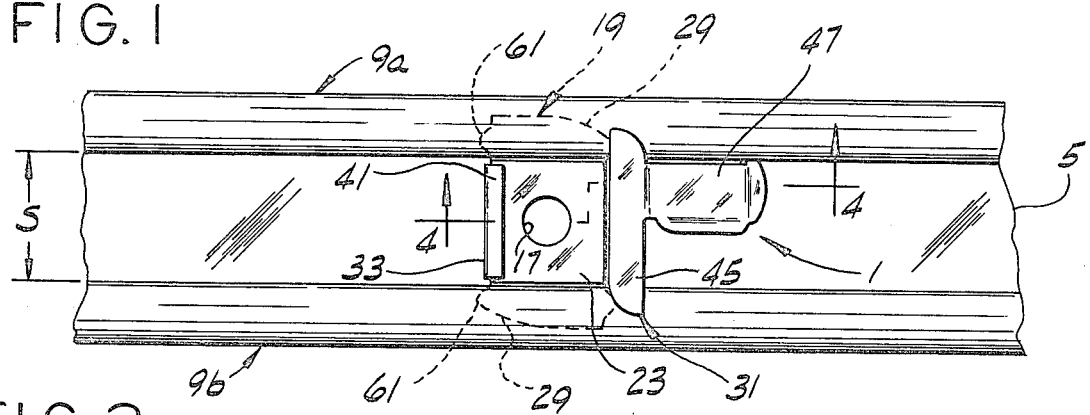
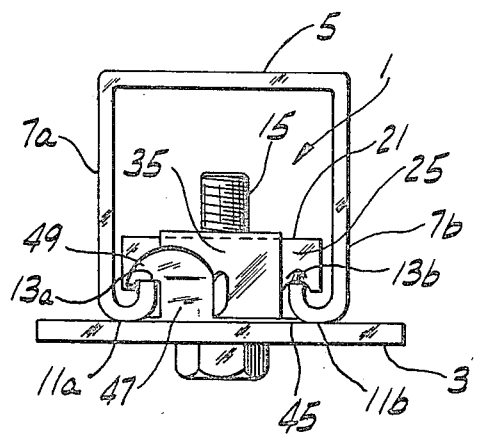
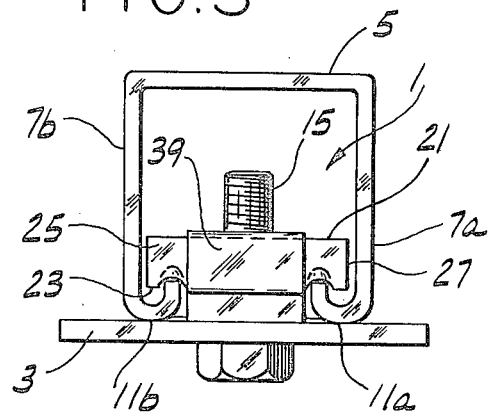
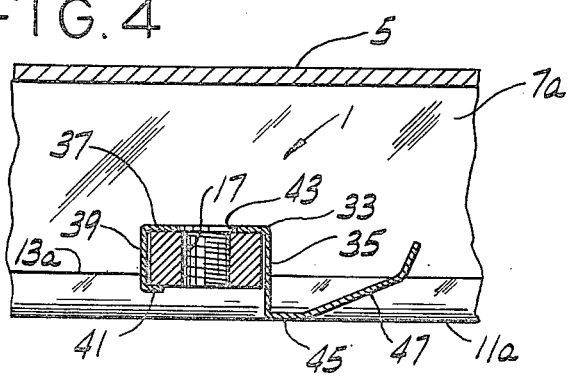
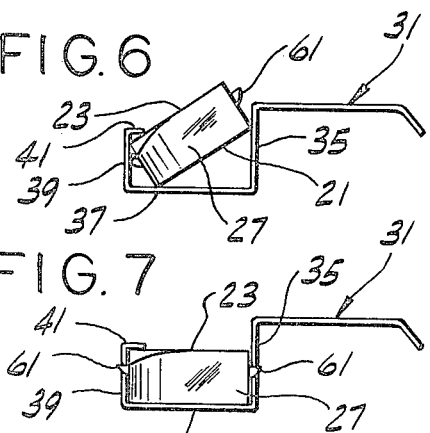
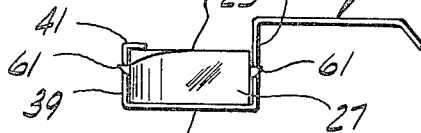
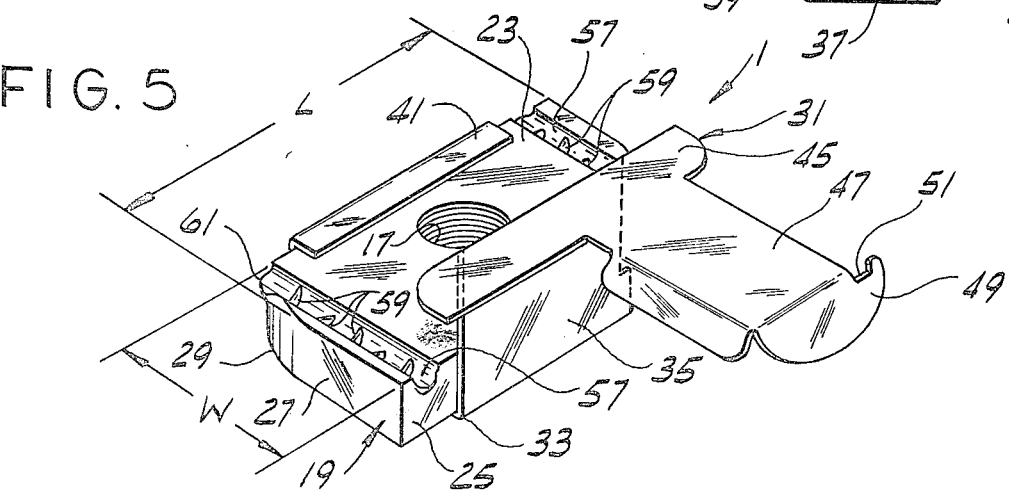

FASTENER FOR METAL FRAMING

BACKGROUND OF THE INVENTION

This invention relates generally to fasteners for fastening objects to metal channel framing and, more particularly, to a nut having means thereon for clamping the nut to the channel prior to securement of the object to the channel.

Electrical conduit, pipes, fixtures, etc., are commonly supported overhead or vertically by channel framing conventionally having side flanges with inwardly turned, hook-shaped lips defining a slot therebetween. Typically, an elongate nut (narrower than but longer than the slot) is used for securing objects to the framing, the nut first being aligned with, entered into, and passed through the slot, and then turned 90° to a crosswise position with the outside face of the nut engaging the inside face of the channel lips. Various means have heretofore been used for holding the nut against the channel in its crosswise position prior to and during securement of an object to the channel.

One such means is a coil compression spring on the inside face of the nut. Upon insertion of the nut into the channel, this spring reacts from the channel bottom and pushes the nut against the channel lips. This arrangement has several serious disadvantages, however, one being that each channel of different depth requires a spring of correspondingly different length, thus greatly increasing the number of fastener sizes which need to be stocked. Moreover, while securing parts of the framing, the nuts can tilt and topple over into the channel. It is also difficult to use the channel as a raceway for conduit, wires or the like, since the spring substantially blocks the entire channel.

Other prior art devices utilize a coil spring attached to the outside face of the nut for spanning the channel and pulling the nut into engagement with the channel lips. This type of device also has its drawbacks, however, inasmuch as the spring tends to slip off the lips of the channel and the nut to fall into the channel.

The fastener disclosed in my U.S. Pat. No. 4,146,074, issued Mar. 27, 1979, solves the aforementioned problems in that it provides a clear channel for carrying conductors and remains securely in place on the channel prior to and during securement of an object of the channel. However, while the installation and use of this fastener has been entirely satisfactory, its manufacture has required that the sides of the nut be slotted. This, of course, requires a separate machining step with its attendant costs. Moreover, it makes the fastener more difficult to assemble, thereby increasing labor costs.

Reference may be made to U.S. Pat. Nos. 1,306,100 and 3,483,910 and British Pat. Nos. 513,368 and 1,061,149, all of which disclose fasteners of the same general type as this invention.

SUMMARY OF THE INVENTION

Among the several objects of this invention may be noted the provision of a fastener which is readily installed on a channel and self-retaining thereafter; the provision of such a fastener which remains securely in place on the channel prior to and during securement of an object to the channel; the provision of such a fastener which provides a clear channel for carrying an increased number of conductors; the provision of such a fastener which fits channels of all depths, thus reducing the number of fastener sizes which need to be stocked; and the provision of such a fastener which is economical to produce and easy to assemble.

Briefly, an improved fastener of this invention, which is useful for securing a part to metal framing having a slot and inside and outside faces on opposite sides of the slot, comprises an elongate body having an inside and an outside face, opposite sides and opposite ends. The width of the body is less than that of the slot in the framing, whereby the body may be generally aligned with the slot, entered into the slot and passed through the slot from the outside to the inside of the framing and then turned to extend in crosswise position for engagement of portions of the outside face of the body adjacent the ends of the body, with the inside face of the framing at opposite sides of the slot.

The fastener further includes means for clamping the body in place in the aforesaid crosswise position comprising a clamp member secured to the body. This clamp member has a crosshead spaced outwardly from the outside face of the body at one side of the body, the crosshead being longer than the width of the slot, and spring latch means which is sprung into engagement with the inside face of the framing when the body is in a position wherein its outside face engages the inside face of the framing on opposite sides of the slot, thereby to bring the ends of the crosshead into clamping engagement with the outside face of the framing on opposite sides of the slot, and the body into clamping engagement with the inside face of the framing on opposite sides of the slot. Other objects and features will be in part apparent and in part pointed out hereinafter.

BRIEF DESCRIPTION OF THE DRAWINGS

FIG. 1 is a bottom plan of a fastener of this invention installed on an overhead channel frame;

FIG. 2 is a left end elevation of FIG. 1 showing a part secured to the channel by means of the fastener;

FIG. 3 is a right end elevation of FIG. 1 showing a part secured to the channel by the fastener;

FIG. 4 is a vertical section on line 4—4 of FIG. 1;

FIG. 5 is a perspective of the fastener; and

FIGS. 6 and 7 are views illustrating the assembly of the fastener.

Corresponding reference characters indicate corresponding parts throughout the several views of the drawings.

DESCRIPTION OF A PREFERRED EMBODIMENT

Referring now to the drawings, a fastener of this invention is indicated in its entirety at 1 and is shown securing a part 3 (such as a bracket) to a metal channel frame or support 5. This channel has a pair of side flanges 7a, 7b, the outer ends of which have inwardly-directed lips formed thereon as indicated generally at 9a and 9b. These lips are hook-shaped, having curved outside faces 11a, 11b terminating in inside edges 13a, 13b, and are spaced from one another to define a slot S therebetween which extends the length of the channel. As illustrated, the part 3 spans slot S and engages the outside faces 11a, 11b of the channel lips at opposite sides of the slot, the part being locked in position by means of a conventional fastening element such as a bolt 15 extending through the part and threaded into a tapped hole or bore 17 in fastener 1. Thus, tapped bore 17 constitutes means for securement to the body of bolt 15.

More particularly, fastener 1 comprises an elongate body or nut, generally designated 19, having a relatively wide inside face 21, a relatively wide outside face 23, opposite sides 25 and opposite ends 27. While the length L of nut 19 is greater than the width of channel slot S (but less than the distance between channel side flanges 7a, 7b), the width W of the nut is less than the width of slot S so that the nut may be inserted into and installed on the channel in a manner to be hereinafter described. Diagonally opposite corners of the nut are rounded as indicated at 29 for facilitating such installation.

The fastener also includes a clamp member, generally desigated 31, on the nut 19. This clamp member is preferably integrally formed as a one-piece unit from a suitable resilient sheet metal such as stainless steel and comprises a generally J-shaped stem 33 having a first vertical section 35 (a right section as viewed in FIGS. 4 and 5) at the right side 25 of the nut, a second horizontal section 37 bent from the inner end of the right section 35 on the inside face 21 of the nut, and a third section 39 bent from the left end of the horizontal section 37 on the left side 25 of the nut. The outer end of the left section 39 of the stem is bent generally perpendicularly to form a lip 41 extending in face-to-face relationship with the outside face 23 of the nut. For reasons which will appear hereinafter, the outer end portion of the right vertical section 35 of the stem is reduced in width, the latter being considerably less than the width of the slots. As shown best in FIG. 4, the horizontal section 37 of the stem on the inside face of the nut 19 has an opening 43 therein in vertical registry with the bore 17 in the nut so as to permit the bolt 15 to be threaded through the nut and stem.

Spaced from the outside face 23 of the nut at the outer end of the right section 35 of the stem is a crosshead 45 having a length greater than the width of the slot S in the channel frame for engagement of its outer ends with the outside faces 11a, 11b of the channel lips 9a and 9b at opposite sides of the slot. As shown, this crosshead is integrally formed with the stem 33 and is bent from the outer end of the stem to extend generally perpendicularly therefrom on the side of the stem opposite the nut, i.e., the right side of the stem as viewed in FIGS. 4 and 5.

In accordance with this invention, and as shown in FIG. 5, a resilient spring latching arm 47 extends laterally from the right side of the crosshead 45. This arm 47 is integrally formed with the cross-head 45 and, when in its unflexed or relaxed position, is generally coplanar with the crosshead. The outer end of the spring arm has a finger 49 extending laterally therefrom. When the latching arm is sprung to clamp the fastener on the channel 5 (FIGS. 1–4), this finger engages the inside edge 13a of the channel lip 9a, with the lip being received in a notch 51 in the finger. To reduce the risk of injury on the exposed edges of the arm 17, the outer end of the arm is angled downwardly and a flap 53 is bent down from the arm at the side of the arm opposite the finger 49.

To insure that the fastener 1 remains in position (even on a vertical channel) prior to and during securement of a part to the channel, the inside edges 13a, 13b of channel lips 9a, 9b are received in parallel slots 57 extending across the outside face 23 of the nut at opposite sides of bore 17. These slots have upstanding teeth 59 therein for providing a firm grip between the nut 19 and the channel lips. Inasmuch the crosshead 31 lies below the plane tangent to the outside faces 11a, 11b of the channel lips, the part 3 rests flush against the lips when bolted in position.

The clamp member 31 is engageable with the nut for preventing any substantial relative movement between the clamp member and the nut. In this regard, it will be seen in FIG. 5 that the nut is deformed at the ends of each of the two slots 57 to provide a pair of projections, each designated 61, at each side of the nut 19 toward opposite ends of the nut. The first and third sections 35, 39 of the stem 33 fit between these projections 61 and are engageable therewith for preventing substantial sliding movement between the clamp member 31 and the nut 19 in a direction lengthwise of the nut. Substantial movement of the nut away from section 37 of the stem on the inside of face 21 of the nut is prevented by the lip 41 on the outside face of the body and, in addition, by the relatively snug fit of the nut in the stem between the first and third sections 35, 39 of the stem.

To install a fastener of the present invention on the channel frame 5, the nut 19 is aligned with, entered into and passed through slot S from the outside to the inside thereof and then rotated clockwise a quarter turn to a position in which the nut extends generally crosswise of the slot S. This may readily be accomplished by using the latching arm 47 as a handle to manipulate the fastener. The fact that the outer portion of the right section 35 of the stem is of reduced width provides the necessary clearance between the stem and the channel lips 9a, 9b for enabling the nut to be turned to its crosswise position. The rounded corners 29 of the nut also facilitate rotation of the nut to its crosswise position, further rotation being prevented by the unreduced square corners of the nut which thus insure proper alignment of the serrated slot 57 with the channel edges 13a, 13b, and assist in holding the nut against further turning as bolt 15 is tightened. As the nut is turned to span the slot, the outer ends of the crosshead 47 may or may not engage the outside faces 11a, 11b of the channel lips, depending on the orientation of the channel on which the nut is being installed. If, for example, the channel is mounted on a floor with the slot S opening upwardly, the ends of the crosshead will bear on the channel lips. This will also be the case if the fastener is installed in a vertical channel, such as a wall-mounted channel. However, in the case of an overhead or ceiling-mounted channel where the slot opens downwardly, the crosshead 45 may not engage the flange lips 9a, 9b as the nut is turned generally crosswise in the slot.

In any event, after the nut has been turned to its crosswise position relative to the slot, the fastener is quickly and easily clamped into position on the channel simply by pushing the latching arm 47 inwardly toward the bottom of the channel for pivoting the fastener to a position wherein the nut is generally parallel to the channel bottom with the inner edges 13a, 13b of the lips engaging the outside face of the nut, and wherein the ends of the crosshead are in engagement with the outside faces 11a, 11b of the channel. The outer end of the latching arm is then pushed further inwardly, thereby springing the latching arm to clamp the outer ends of the crosshead 45 against the outside faces 11a, 11b of the channel lips at opposite sides of the slot S and to clamp the nut against the inner edges of the channel lips at opposite sides of the slot. The latching arm is sprung inwardly to a position at which the finger 49 at the outer end of the arm can be brought into engagement with the inner edge 13a of lip 9a, the latter being received in the notch 51 in the finger to lock the arm in its sprung position for maintaining the nut 19 clamped against the channel lips with the inner edges 13a, 13b of the lips in slots 57 in the nut. The fastener may be quickly and easily removed from the channel (as for reuse) by simply reversing the steps set out above.

It will be apparent from the foregoing that the fastener of this invention is readily installed on a channel support and is self-retaining thereon after installation. Moreover, the fastener may be used with a channel of any depth and leaves the channel clear of any obstruction for freely carrying conductors and the like.

Another important advantage of the invention is that the clamp member is readily assembled with the nut and secured thereto without having to slot or otherwise modify the nut especially for this purpose. In this connection, the nut 19 and clamp member 45 are assembled by placing the nut in the stem 33 in the position shown in FIG. 6, that is, wherein it extends generally diagonally between the vertical sections 35, 39 of the stem with one (the right) side of the nut adjacent the outer end of the right section 35 of the stem and the other (left) side of the nut adjacent the left section 39 of the stem between the lower section 35 of the stem and the lip 41. The nut 19 is then pivoted to its assembled position (FIG. 7) in which the inside face 21 of the nut is in face-to-face contact with the lower section 37 of the stem, and in which the sides 25 of the nut are immediately adjacent the left and right sections of the stem (the width of the nut is only slightly less than the spacing between the vertical sections 35, 39 of the stem). As the nut is pivoted clockwise from its FIG. 6 position, the left and right vertical sections 39, 35 of the stem spring apart until the nut reaches its FIG. 7 position whereupon the sections 35, 39 spring back to their unflexed or relaxed position for holding the nut in snug assembly with the clamp member.

In view of the above it will be sen that the several objects of the invention are achieved and other advantageous results attained.

As various changes could be made in the above constructions with departing from the scope of the invention, it is intended that all matter contained in the above description or shown in the accompanying drawings shall be interpreted as illustrative and not in a limiting sense.

What is claimed is:

1. For securement to metal framing having a slot and inside and outside faces on opposite sides of the slot for attachment of parts to the framing through the slot from outside of the slot, a fastener comprising:

a rigid elongate body having a first face constituting an inside face and an opposite relatively wide face constituting an outside face, opposite sides, and opposite ends, the width of said body between said sides being less than the width of the slot in the framing and the length of said body between said ends being greater than the width of said slot, whereby the body may be generally aligned with the slot, entered into the slot and passed through the slot from the outside to the inside of the framing and then turned to extend in crosswise position relative to the slot for engagement of portions of said relatively wide outside face of the body adjacent the ends of the body with the inside of the framing at opposite sides of the slot; and means of separate construction from the body for clamping the body in place in its said crosswise position comprising a spring clamp member carried by the body having a crosshead spaced outwardly from the outside face of the body at one side of the body, the crosshead being longer than the width of the slot, and spring latch means adapted to be sprung into engagement with the inside face of the framing when the body is in said crosswise position wherein its outside face engages the inside face of the framing on opposite sides of the slot, thereby to bring the ends of the crosshead into clamping engagement with the outside face of the framing on opposite sides of the slot and the body into clamping engagement with the inside face of the framing on opposite sides of the slot, said body having means for resecurement thereto or a fastening element for fastening a part to said framing on the outside of the slot.

2. A fastener as set forth in claim 1 wherein said clamp member comprises a stem at said one side of the body extending outwardly beyond the outside face of the body, the crosshead being at the outer end of the stem, and said latching means is on the side of the stem opposite the body.

3. A fastener as set forth in claim 2 wherein said latching means comprises a spring latching arm extending laterally from the crosshead.

4. A fastener as set forth in claim 3 wherein said arm has a finger extending laterally therefrom at its outer end engageable; on springing of the arm, with the inside face of the framing.

5. A fastener as set forth in claim 4 wherein said finger has a notch therein for receiving a portion of the inside face of the framing.

6. A fastener as set forth in claim 3 wherein said stem, crosshead and latching arm are integrally formed as a one-piece unit.

7. A fastener as set forth in claim 6 wherein said clamp member is of resilient sheet metal.

8. A fastener as set forth in claim 1 wherein the clamp member extends on the inside face of the body and on said one side of the body outwardly beyond the outside face of the body.

9. A fastener as set forth in claim 8 wherein said clamp member comprises a generally J-shaped stem having a first section at said one side of the body extending outwardly beyond the outside face of the body and having said crosshead at its outer end, a second section extending from the inner end of the first section on the inside face of the body, and a third section extending outwardly from the second section on the other side of the body.

10. A fastener as set forth in claim 9 wherein said third section of the stem has a lip at its outer end extending generally perpendicularly to the third section on the outside face of the body.

11. A fastener as set forth in claim 10 wherein the crosshead, stem and lip are integrally formed as a one-piece unit.

12. A fastener as set forth in claim 11 wherein said clamp member is of resilient sheet metal.

13. A fastener as set forth in claim 12 wherein the spacing between said first and third sections of the stem is such that they are adapted to be sprung apart when the body, on assembly with the clamp member, is pivoted from a first position in which it extends generally diagonally between the first and third sections of the stem with said one side of the body adjacent the outer end of the first section of the stem and the other side of the body adjacent the third section of the stem between the second section of the stem and said lip, to a second assembled position in which it extends generally parallel to the second section of the stem between the first and third sections of the stem, the first and third sections being adapted to spring back to their unflexed positions when the body is in its said assembled position for holding the body in assembly with the clamp member.

14. A fastener as set forth in claim 1 wherein the clamp member is engageable with the body for preventing any substantial relative movement between the clamp member and the body.

15. A fastener as set forth in claim 14 wherein each side of said body is formed with a pair of projections thereon spaced lengthwise of the body toward opposite ends of the body, the clamp member being engageable with said projections for preventing substantial relative movement between the clamp member and the body lengthwise of the body.

16. A fastener as set forth in claim 15 wherein said clamp member comprises a generally J-shaped stem having a first section at said one side of the body extending outwardly beyond the outside face of the body and having said crosshead at its outer end, a second section extending from the inner end of the first section on the inside face of the body, and a third section extending outwardly from the second section on the other side of the body, said first and third sections of the stem being adapted to fit between said projections at opposite sides of the body and being engageable therewith for preventing substantial relative movement between the clamp member and the body lengthwise of the body.

17. A fastener as set forth in claim 16 wherein said third section of the stem has a lip at its outer end extending generally perpendicularly to the third section on the outside face of the body thereby to prevent substantial movement of the body outwardly away from said second section of the stem.

* * * * *